United States Patent
Schroeder et al.

(10) Patent No.: US 8,490,637 B2
(45) Date of Patent: Jul. 23, 2013

(54) WALKING DEVICE

(76) Inventors: Gary L. Schroeder, Davis, CA (US);
Frank Sivo, Leonia, NJ (US); Wang Su,
East Patchogue, NY (US)

( * ) Notice: Subject to any disclaimer, the term of this patent is extended or adjusted under 35 U.S.C. 154(b) by 534 days.

(21) Appl. No.: 12/660,048

(22) Filed: Feb. 20, 2010

(65) Prior Publication Data

US 2011/0203626 A1    Aug. 25, 2011

(51) Int. Cl.
*A45B 3/00*    (2006.01)

(52) U.S. Cl.
USPC .......................................................... 135/66

(58) Field of Classification Search
USPC ........... 135/66; 254/124, 126, 134; 297/217.3
See application file for complete search history.

(56) References Cited

U.S. PATENT DOCUMENTS

| | | | |
|---|---|---|---|
| 4,071,152 A | 1/1978 | Kinkead et al. | |
| 4,184,380 A | 1/1980 | Rivin | |
| 5,259,236 A | 11/1993 | English | |
| 5,331,990 A | 7/1994 | Hall et al. | |
| 5,477,211 A * | 12/1995 | Reynolds | 340/689 |
| 5,554,975 A * | 9/1996 | Hall et al. | 340/573.7 |
| 5,794,639 A | 8/1998 | Einbinder | |
| 5,826,605 A | 10/1998 | Hilton | |
| 5,853,219 A * | 12/1998 | Santuccio | 297/5 |
| 5,862,824 A | 1/1999 | Herman | |
| 6,039,064 A | 3/2000 | Hilton | |
| 6,055,997 A * | 5/2000 | Greenstadt et al. | 135/65 |
| 6,068,007 A | 5/2000 | Hilton | |
| 6,163,249 A * | 12/2000 | Betcher, III | 340/407.1 |
| 6,330,888 B1 * | 12/2001 | Aravantinos et al. | 135/66 |
| 6,392,556 B2 * | 5/2002 | Tomich | 340/689 |
| 6,666,796 B1 | 12/2003 | MacCready, Jr. | |
| 6,745,786 B1 * | 6/2004 | Davis | 135/65 |
| 6,864,796 B2 * | 3/2005 | Lehrman et al. | 340/573.1 |
| 7,265,680 B2 * | 9/2007 | Igami et al. | 340/689 |
| 7,637,273 B1 | 12/2009 | Lisenby | |
| 2004/0144410 A1 | 7/2004 | Cheng et al. | |
| 2006/0129308 A1 | 6/2006 | Kates | |
| 2006/0206167 A1 | 9/2006 | Flaherty et al. | |
| 2008/0072942 A1 * | 3/2008 | Warren | 135/67 |
| 2009/0038664 A1 * | 2/2009 | Juslin et al. | 135/66 |

OTHER PUBLICATIONS

International Search Report and Written Opinion of the International Searching Authority, Apr. 19, 2011, all pages, by International Searching Authority, Alexandria USA.
"Intelligent walking stick", authored by IBM Corporation, published by IP.COM, dated Aug. 29, 2006, 2 pages.

* cited by examiner

*Primary Examiner* — Noah Chandler Hawk

(57) ABSTRACT

An improved walking device is disclosed wherein the walking device comprises an elongated body that is more than one foot in length, a movable arm coupled to the elongated body, a power source, and a first sensor, and wherein the first sensor is capable of detecting an orientation of the walking device and producing an electronic signal based on the orientation, and wherein the electronic signal is capable of at least partially causing a movement of the movable arm.

20 Claims, 6 Drawing Sheets

WALKING DEVICE

FIELD OF INVENTION

The present invention is generally related to an improved walking device, such as a walking cane or a crutch, that is relatively easy to be picked up when dropped on the ground.

BACKGROUND OF THE INVENTION

Presently, many people use devices such as walking canes or crutches to facilitate their movement. Walking canes and crutches can fall from or be dropped by the user, or can fall from any given place of rest. Once they fall on the ground, it could be very challenging for the user to pick them up, because this requires the user to bend over to reach the ground. Normally, those who require a walking cane or a crutch to move around are those with compromised or impaired physical conditions. Bending over to reach the ground could be very difficult for them, if not impossible.

There have been some attempts to solve this problem. For example, U.S. Pat. Nos. 5,826,605, 6,039,064, and 6068007 disclosed a design which uses a series of complicated mechanicals to raise an arm when a cane or crutch falls on the ground. The draw back of this design is that it is too complicated, involves too many mechanical parts, and may not be very reliable. Another attempt to solve this problem is described in the paper "Intelligent walking stick". This paper disclosed a walking stick with three prongs that can open up similar to the spokes on an umbrella. The opening up mechanism is based on voice command. When the user speaks a phrase which matches a prerecorded voice signature, the three prongs are opened, resulting in two prongs touching the ground and raising the cane, and the third prong sticking in the air for the user to pick up. This design requires sophisticated voice recognition, which may not work very well in a noisy environment, such as in the streets or in a shopping plaza. Moreover, this design requires three prongs to be installed on a walking device, which complicates the design of the walking device.

Therefore, there is a need for an improved device to facilitate the convenient retrieval of a walking cane or a crutch that is dropped or falls on the ground.

DETAILED DESCRIPTION OF POSSIBLE EMBODIMENTS OF THE INVENTION

Figure 1:
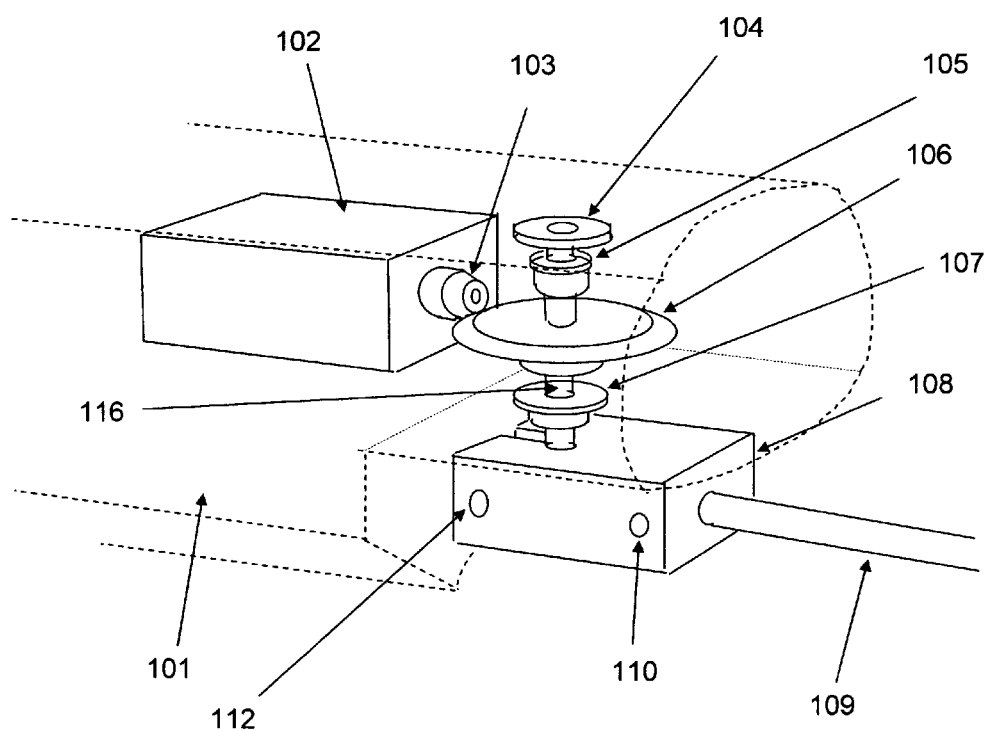
FIG. 1 is a perspective view showing the motor drive assembly of one embodiment of the invention.

Possible embodiments of the invention are discussed in this section.

According to one embodiment of the invention, an improved walking device is presented. This walking device could be a walking cane, a crutch, or any other devices that assist in walking. A walking device usually has an elongated body that is more than one foot in length. A sensor is incorporated into the walking device. The sensor senses an orientation of the walking device. The orientation sensor could be an accelerometer or a rate sensor such as a gyroscope. For example, a two axis or three axis accelerometer can sense gravity pull in two or three directions. The gravity pull in two or three directions measured by an accelerometer can be used to indicate a device's relative angle to the ground. The change of gravity pull in those directions can be used to measure the change of orientation of the device relative to the ground. Multiple one axis accelerometers can be used in combination to achieve similar results as a multi-axis accelerometer. Based on the gravity pull in one or more directions, an accelerometer can sense the orientation of a device relative to the ground fairly accurately. It can sense whether the walking device is vertical or horizontal, and if horizontal, which side is up and which side is down. It can also sense increments within the vertical-horizontal axis. The accelerometer produces electronic signals indicating these measurements. There may be other orientation sensing sensors which can be used in the present invention to achieve similar effects. They are also considered part of the present invention. A power source is also incorporated into the walking device which supplies power to the sensor. At least one movable arm is attached to the walking device.

When the improved walking device according to one embodiment of the present invention falls onto the ground, the orientation sensor such as an accelerometer senses an orientation of the elongated body of the walking device, for example horizontal to the ground or vertical to the ground. If the sensed orientation is approximately horizontal to the ground within a range, it suggests that the walking device is likely dropped, then the electronic signal produced by the sensor can cause the movable arm to rise up. The range is to account for the fact that the walking device may rest on an object on the ground or other situations where the walking device is dropped but not perfectly horizontal. If the movable arm's length is about one foot or longer, the walking device's user can grab it without having to bend too much. A more preferred length for the movable arm is about two feet. By grabbing the movable arm, the user can lift the dropped walking device because the movable arm is attached to the walking device. To cause the movable arm to move or rise by the electronic signal produced by the orientation sensor, there are multiple possible embodiments. According to one embodiment of the present invention, the electronic signal produced by the orientation sensor is sent to a microcontroller. The microcontroller then controls the movable arm to move based on the electronic signal. This embodiment will be introduced with greater details later.

According to another embodiment of the present invention, the electronic signal opens a locking device, such as a latch, that locks the movable arm in a closed position. Once the locking device is opened, the movable arm is moved to a raised position by means such as a spring or a counterweight. The spring can be a coil spring or other types of springs. The spring at one end is attached to the walking device, at another end is attached to the movable arm and biases the movable arm to a raised position. Normally, the locking device would lock the movable arm to a closed position. Once the locking device is opened, the spring will bias the movable arm to the raised position. After the walking device is picked up, the user can push the movable arm back to the closed position again. The counter weight acts similar to a spring. The movable arm is installed on a hinge or any other type of fulcrum, and a counter weight is connected to the shorter end of the movable arm. The weight of the counterweight is so that if unhindered, the counterweight will swing toward the ground and move the longer end of the movable arm upwards away from the ground. Normally, the movable arm is locked in a closed position by the locking device against the weight of the counter weight. However, if the locking device is opened, the counter weight will push the movable arm upwards to a raised position. The locking device can be opened by the electronic signal produced by the orientation sensor in many ways. For example, it can be opened by an electric motor controlled by the electronic signal, or it can also be opened by an electromagnetic device controlled by the signal. The electronic signal produced by the orientation sensor can act as a trigger that turns on a current through the electromagnetic device. Once there is a current, the electromagnetic device will produce a magnetic field which can pull the locking device to an opened position.

The movable arm is preferably light in weight so that it can be easily moved. The movable arm can be either stiff or flexible. According to one embodiment of the present invention, the movable arm is made of a material, such as rubber or carbon fiber, which is stiff enough to remain relatively straight but is also flexible so that it can bend easily when it hits an obstacle. This flexible feature is useful to avoid damage if the movable arm hits an object when rotating.

FIG. 1 is a perspective view showing the motor drive assembly of one embodiment of the present invention. According to this embodiment, movable arm 109 is moved by a motor 102. The motor is controlled by a microprocessor and an orientation sensing sensor which are not shown in this figure. The motor 102 has a bevel pinion gear 103 mounted on its shaft. The bevel pinion gear 103 drives a larger bevel gear 106 that is attached to an output drive shaft 116. The movable arm 109 is attached to the output drive shaft 116 by an attachment clamp hub 108. Screws 110 and 112 can be used to attach the output drive shaft 116 and the movable arm 109 to the attachment clamp hub 108. Top bearing 105 and bottom bearing 107 facilitates the movement of the output drive shaft 116. The motor 102 output speed can vary, for example it can be about 45 rotations per-minute. The larger bevel gear 106 reduces the rotational speed to increase the turning force at the output drive shaft 116. For example it reduces the rotational speed by one third, the resulting rotational speed of the output drive shaft 116 is about 15 rotations per-minute. This will cause the movable arm 109 to move ninety degrees in about one second. If the movable arm 109 is in a position that is approximately horizontal compared to the ground. After moving ninety degrees vertically, it will become approximately vertical compared to the ground.

According to another embodiment of the invention, a second sensor 104 is coupled to the output drive shaft 116. The second sensor 104 can be a potentiometer. A sensor such as a potentiometer can sense the rotational position of the movable arm 109 and produce an electronic signal feedback indicating the rotational position of the movable arm 109. The electronic feedback from the second sensor together with the electronic signal produced by the orientation sensor can both be used by the microprocessor to control the movement of the motor 102.

According to one embodiment of the present invention, the motor and gear assembly as shown in FIG. 1 are built into a cane, or a crutch, or other walking assistants, together forming an improved walking device. A walking device such as a cane or a crutch can have a hollowed interior with room enough to contain the motor and gear assembly. Enclosure 101 in this embodiment shows a section of the improved walking device with the motor and gear assembly installed within. The movable arm 109 can be installed outside but near a surface of the improved walking device so that it is rotatable around the output drive shaft 116. According to another embodiment of the present invention, the motor and gear assembly can be enclosed in an independent enclosure to form a module. The module can then be attached to a cane, or a crutch, or other walking assistants to form an improved walking device. User can either choose to buy a new improved walking device with the design built into it, or, if the user already has a cane or crutch, he or she can choose to just buy a module and attach it to the existing walking device to form an improved walking device.

Figure 2:
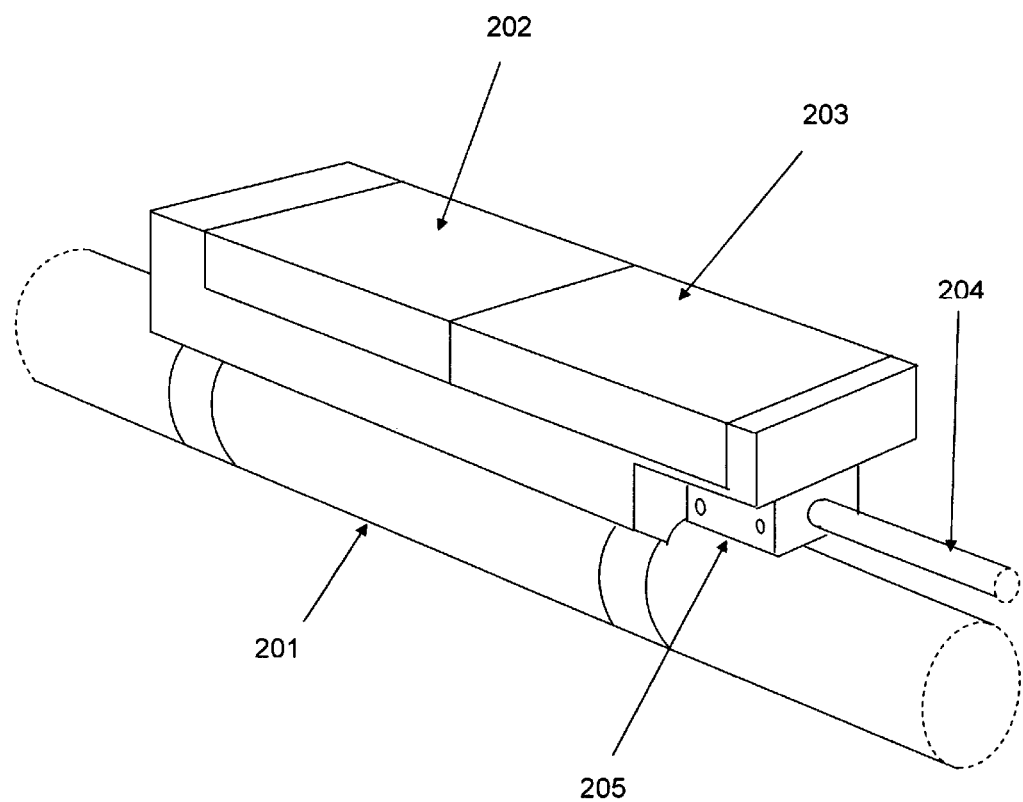
FIG. 2 is a side view of one embodiment of the invention.
Figure 3:
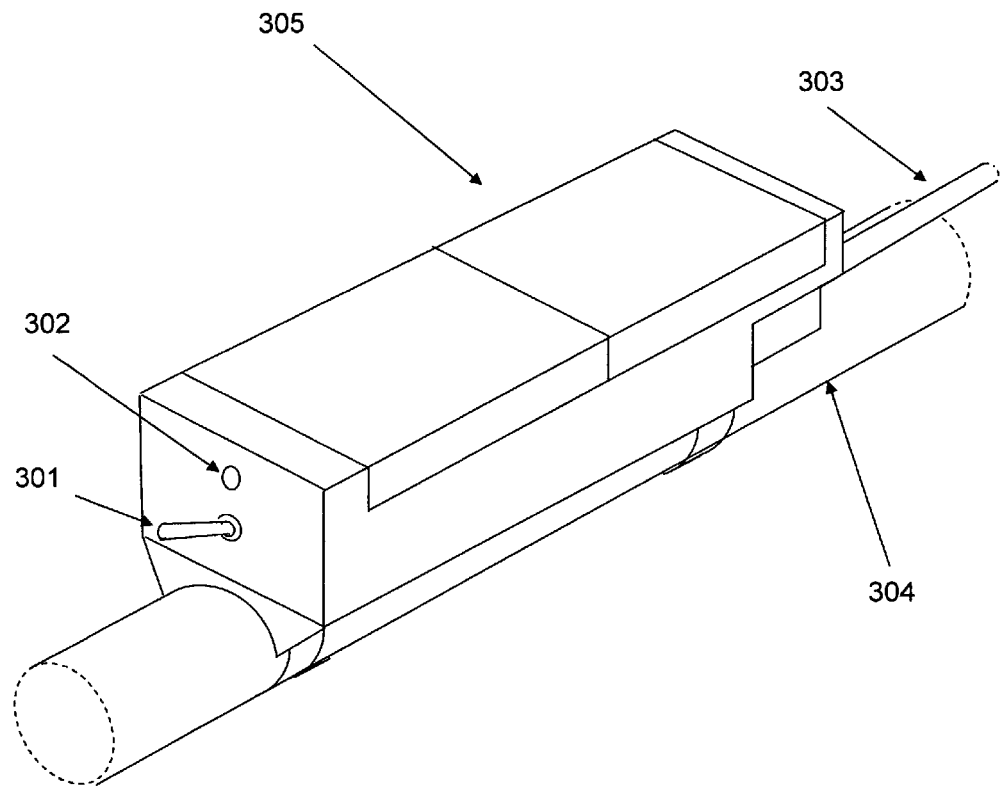
FIG. 3 is a is a side view of one embodiment of the invention.

FIG. 2 is a side view of one embodiment of the present invention. According to this embodiment, movable arm 204 is attached to a drive assembly by an attachment hub 205. The drive assembly is enclosed in compartment 203 as a module. A power assembly coupled to the drive assembly is enclosed in compartment 202. The entire module is attached to walking device 201. FIG. 3 is another side view of one embodiment of the invention. According to this embodiment, movable arm 303 is movably attached to module 305. Module 305 may include a drive assembly, an orientation sensing sensor, a microprocessor, and a power supply. Module 305 may also include a secondary sensor that senses the rotational position of movable arm 303. A power switch 301 can be built into module 305 to turn the power on and off. A low power indicator 302 can also be built into module 305 to give warnings when the power supply is at a low level. The module 305 can be attached to a walking device 304 to form an improved walking device.

Figure 4:
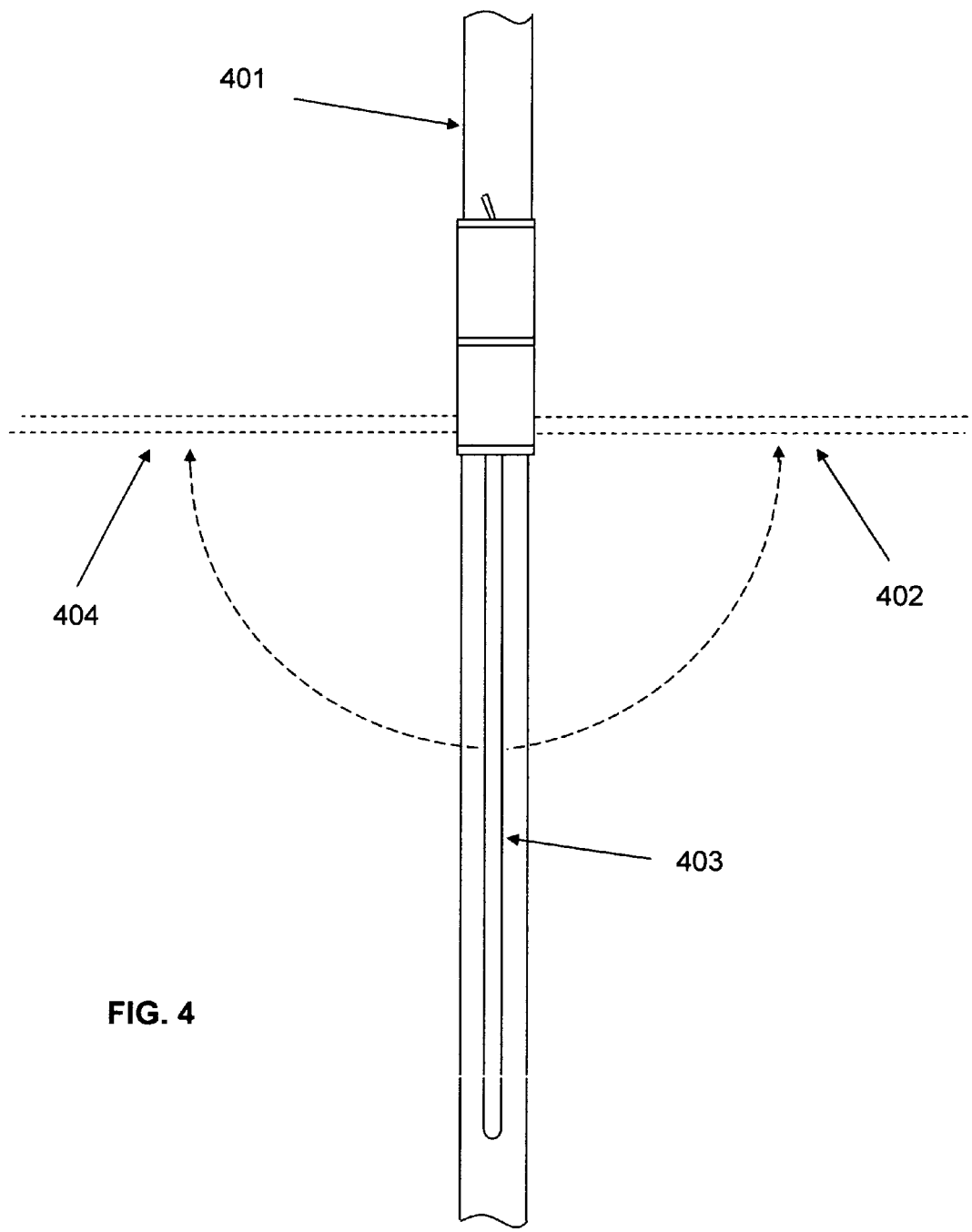
FIG. 4 shows the possible deployment positions of a movable arm according to one embodiment of the invention.

FIG. 4 shows the possible deployment positions of a movable arm according to one embodiment of the invention. If the orientation sensing sensor senses that the improved walking device 401 is in a vertical position, it keeps the movable arm 403 parallel to the improved walking device 401. The improved walking device 401 can be shaped in the way that when it falls on the ground, either its left side rests on the ground or its right side rest on the ground. For example, the improved walking device 401 can have a "U" shaped, "T" shaped, or "F" shaped top so that the physical structure of it dictates that only its right side or its left side can rest on the ground when dropped. It is also possible that without a special shaped top, the structure of the improved walking device 401 is overall relatively flat, or has two flat surfaces on two opposing sides, therefore when it is dropped on the ground, only the right or the left side can rest on the ground. When the improved walking device 401 falls on the ground and rests on its left side, the built in orientation sensor, such as a multi-axis accelerometer, not only senses that the improved walking device 401 is now horizontal rather than vertical, but also sense that it is the left side of the device that is resting on the ground. Once the sensor senses that the improved walking device 401 is dropped and the left side is on the ground, it products electronic signals to cause the movable arm to move to the right vertically into position 402. When in vertical position 402, the movable arm 403 can be grabbed by the user without having to bend too much. On the other hand, when the improved walking device 401 falls on the right side, the sensor senses it and produces electronic signals to cause the movable arm 403 to move vertically to the left position 404. As mentioned earlier, the electronic signal can cause the movable arm 403 to move by many means, for example by controlling a motor with a microprocessor or by opening a locking device to allow a spring or a counterweight to move the movable arm 403.

Figure 5:
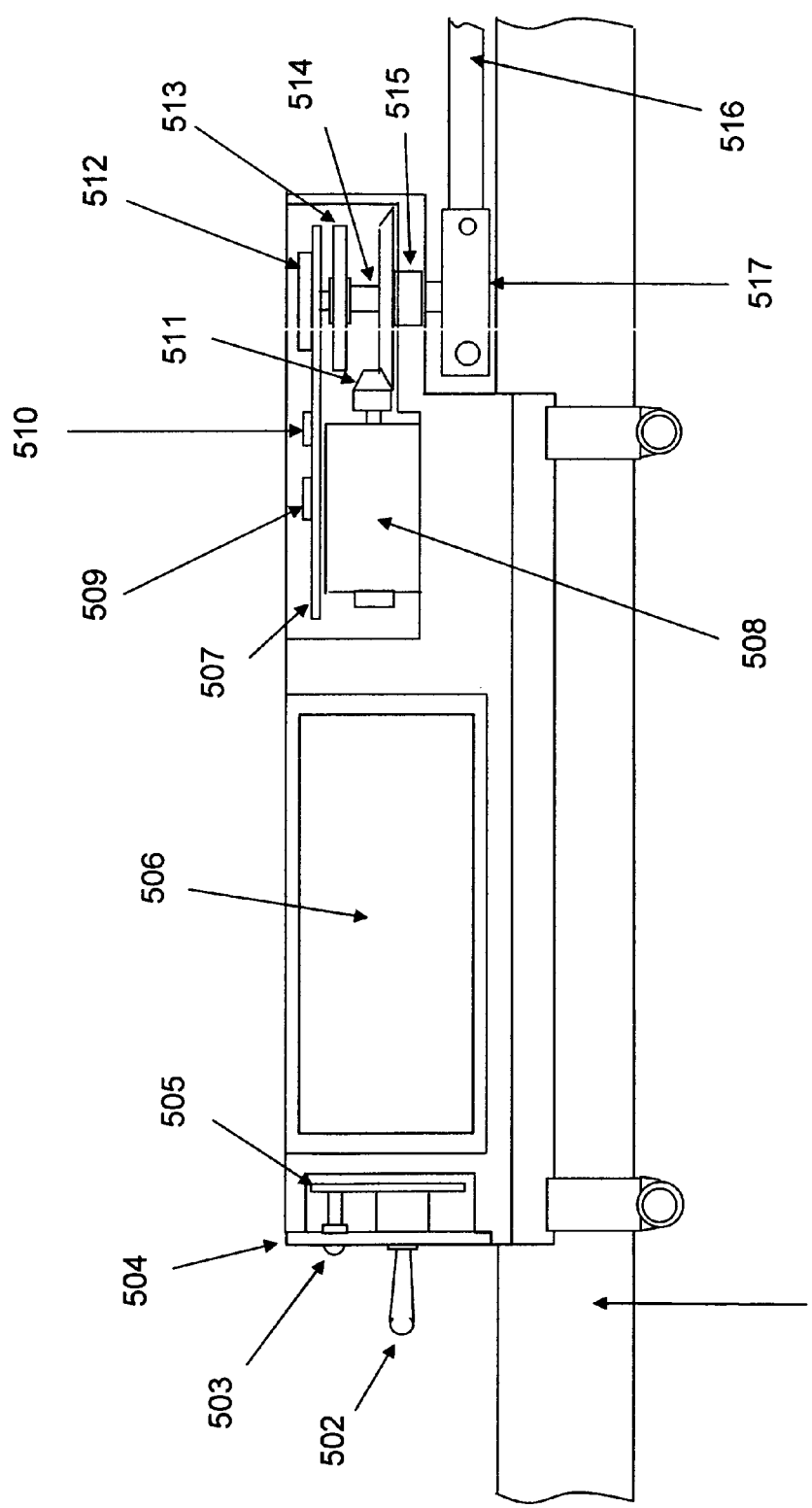
FIG. 5 is an illustrative view of one embodiment of the invention.

FIG. 5 is an illustrative view of one embodiment of the present invention. According to this embodiment, movable arm 516 is attached to output shaft 514 by a clamp hub 517. Orientation sensor 510, for example a two or three axis accelerometer, is mounted on circuit board 507. Orientation sensor 510 senses the orientation of walking device 501. A second sensor 512, for example a potentiometer, is attached to the output shaft 514 and is also mounted on the circuit board 507. The second sensor 512 senses the rotational position of movable arm 516 because they are both attached to the output shaft 514. A sensor such as a potentiometer can give out different electronic signals based on the changing rotational positions of a rotating shaft. These electronic signals can be used to indicate the rotational position of objects attached to the rotating shaft, such as the movable arm 516. A microcontroller 509 is mounted on the circuit board 507. The microcontroller 509 has a built in microprocessor. The microcontroller 509 may either have a built in memory or is connected to an external memory. A software program is either stored in the built in memory or is stored in the external memory connected to the microcontroller 509. The microprocessor within the microcontroller 509 is capable of executing the software program and performing the control functions. The microcontroller 509 receives electronic signals generated by orientation sensor 510 indicating the orientation of the walking device 501, it also receives electronic signals generated by the second sensor 512 indicating the rotational position of movable arm 516. Based on this information, the microcontroller 509 controls a motor 508 by executing a software program. The motor 508 has a driving gear 511 that drives the output shaft 514 by driving another gear connected to the output shaft 514. Bearings 513 and 515 facilitate the movements of output shaft 514. A power source 506 is coupled to the circuit board 507 to supply power to the sensors 510 and 512, the microcontroller 509, and the motor 508. The power source 506 could be a number of batteries. A power control circuit board 505 is coupled to the power source 506. A cover plate 504 covers the power control circuit board 505. A power switch 502 is mounted on the power control circuit board 505 to turn the power on and off. A low power indicator 503 is mounted on the power control circuit board 505 to give warning signals if the power level is low.

According to one embodiment of the present invention, when movable arm 516 rotates with the output shaft 514, sometime it may touch an object and get stuck. When this happens, the motor 508's movement will be inhibited resulting in the motor 508 drawing higher than normal amount of current. The microcontroller 509 checks the motor 508's current draw during the movement of the movable arm 516. If the microcontroller 509 detects unusual amount of current, the microcontroller 509 can either reverse the driving direction of motor 508 so that the movable arm 516 reverses its rotational direction. The microcontroller 509 can also stop the motor 508, and try to restart the motor 508 after some time to see if the blocking object has been removed or not.

Figure 6:
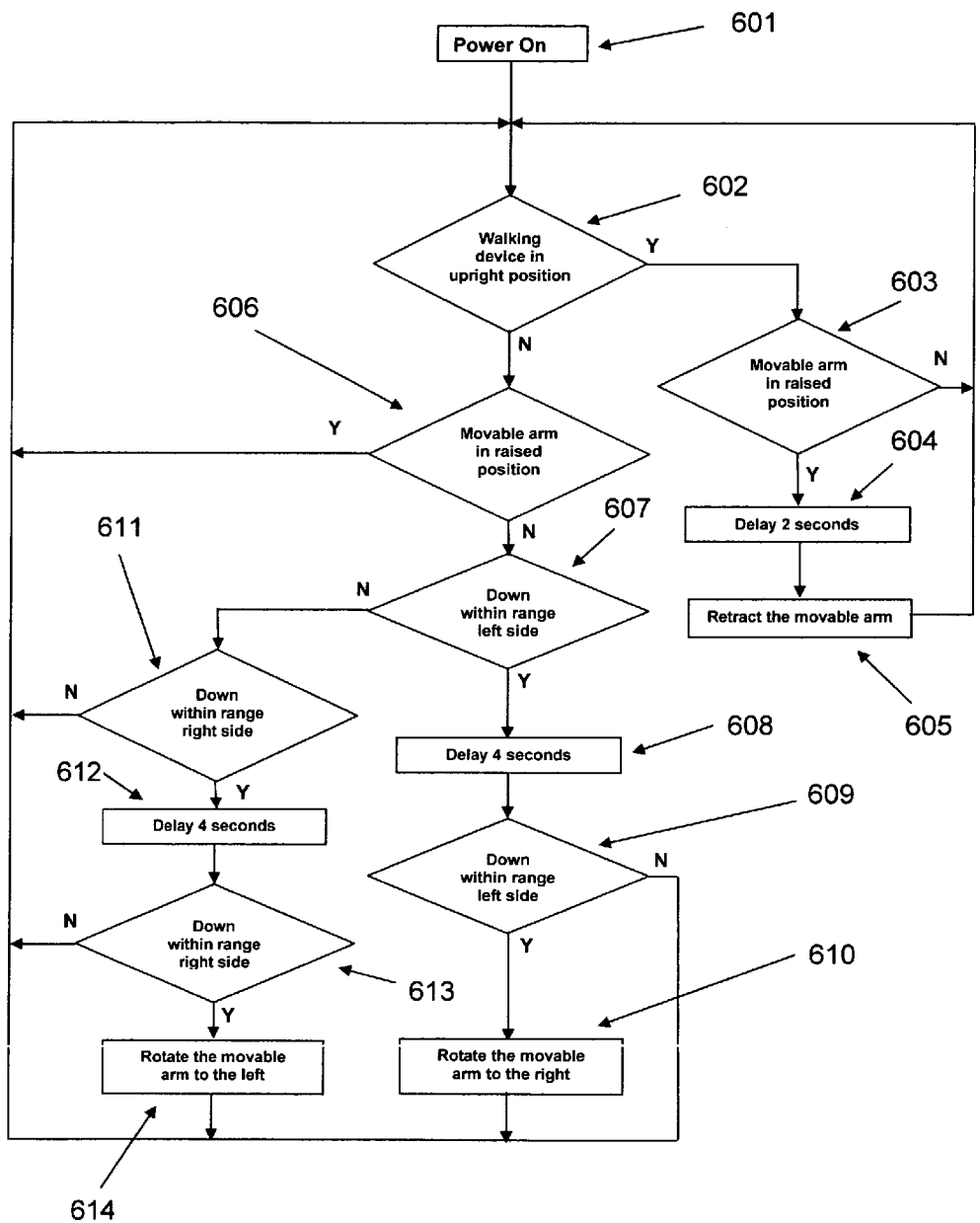
FIG. 6 is a flow chart showing illustrative steps that may be followed to perform the improved walking device functions in accordance with one embodiment of the invention.

FIG. 6 is a flow chart showing illustrative steps that may be followed to perform the improved walking device functions in accordance with one embodiment of the invention. According to this embodiment, the user turns on a power source at step 601. The power source supplies power to a driving system. The system includes an orientation sensor that senses the orientation of a walking device, an optional second sensor that senses the position of a movable arm, a microprocessor, a memory that stores a software program executable by the microprocessor, and a motor. At step 602, the orientation sensor sends electronic signals to the microprocessor which indicate whether the walking device is in an upright position or not. At steps 603 and 606, the second sensor sends electronic signals to the microprocessor which indicate the position of the movable arm. Microprocessor receives these electronic signals and decides next steps. At step 603, if the walking device is in an upright position and the movable arm is not raised, then the program loops back to step 602. On the other hand, if the walking device is in an upright position and the movable arm is raised, this indicates that the walking device was probably dropped and then picked up after the movable arm has been raised. In this situation, at step 604, an optional timer counts a predetermined time, for example 2 seconds, before entering step 605. The timer can be achieved by the software program setting up counting registers within the microprocessor to count internal master clock pulses until a required count total is reached. The timer can be achieved by other methods as well. At step 605, the microprocessor controls the motor to move the movable arm back to the position where it is parallel to the walking device.

At step 606, if the signals received by the microprocessor indicate that the walking device is not in an upright position and the movable arm is raised, then the program loops back to step 602. However, if the walking device is not in an upright position and the movable arm is not raised, then at step 607 the microprocessor makes a further determination from the electronic signal received from the orientation sensor whether the walking device is on the left side within a certain range from a horizontal position. Giving it a range is to count for the fact that the walking device may not be perfectly horizontal even if dropped on the ground. If the answer is yes, a timer counts a delay time, for example 4 seconds, at step 608. The timer is similar to the timer introduced above at step 604. To introduce a time delay has benefits such as allowing the dropped walking device to enter into a relatively stable state. After the time delay, at step 609, the microprocessor takes another electronic signal from the orientation sensor to make a determination if the walking device is still on the left side within a certain range from a horizontal position. If the answer is yes, then at step 610 the microprocessor controls the motor to move the movable arm to the right until it reaches a predetermined position, preferably 90 degrees rotation from its current position. The rotational position can be detected by the second sensor such as a potentiometer. If the answer at step 609 is no, then the program loops back to step 602.

At step 607, if the microprocessor determines that the walking device is not on the left side within a certain range from a horizontal position, then at step 611 the microprocessor makes a further determination from the electronic signal received from the orientation sensor whether the walking device is on the right side within a certain range from a horizontal position. If the answer is no, then the program loops back to step 602. If the answer is yes, a timer counts a delay time, for example 4 seconds, at step 612. After the time delay, at step 613, the microprocessor takes another electronic signal from the orientation sensor to make a determination if the walking device is still on the right side within a certain range from a horizontal position. If the answer is yes, then at step 614 the microprocessor controls the motor to move the movable arm to the left until it reaches a predetermined position, preferably 90 degrees rotation from its current position. If the answer at step 613 is no, then the program loops back to step 602. This is just one embodiment of the present invention. Different steps or different orders of the steps can be performed to achieve similar results.

According to another embodiment of the present invention, when the walking device is within a certain range from a horizontal position, the microprocessor determines the degree by which the walking device is off the horizontal position by taking the measures from the orientation sensor, and compensate that when rotating the movable arm. For example, if the walking device is 20 degrees off the horizontal position, then instead of rotating the movable arm for 90 degrees, the microprocessor controls the motor to rotate the movable arm for only 70 degrees, so that the movable arm ends up to be approximately perpendicular to the ground after the rotation.

According to one embodiment of the present invention, to reduce power consumption, the microprocessor is normally in a sleep mode and is self-timed to wake up for a few microseconds once each second. During each wake up period of the sleep mode, the microprocessor checks the electronic signals from the orientation sensor to determine the orientation status of the walking device, and electronic signals from the second sensor to determine the rotational position of the movable arm. If the walking device is in an upright position and the movable arm is not rotated to the left or to the right, the microprocessor will return to sleep and remain in the sleep mode. Otherwise, the microprocessor exits the sleep mode and rotates the movable arm to a position according to the program. Once the walking device returns to the upright position and the movable arm is parallel to the walking device, the microprocessor can enter into the sleep mode again.

It is obvious that there are numerous different variations and combinations of the above described embodiments of the invention. All these different variations, combinations and their structural or functional equivalences are considered as part of the invention. The terms used in the specification are illustrative and are not meant to restrict the scope of the invention. The described methods have steps that can be performed in different orders and yet achieve similar results. All the variations in the design components or orders of the method steps are considered as part of this invention as long as they achieve substantially the same results.

The invention is further defined and claimed by the following claims.

We claim:

1. A walking device comprising:
    an elongated body that is more than one foot in length;
    a movable arm coupled to the elongated body;
    a power source; and
    a first sensor;
    wherein the first sensor is capable of detecting an orientation of the walking device and producing an electronic signal based on the orientation, wherein the orientation reflects an angular position of the walking device, and wherein the electronic signal is capable of at least partially causing a rotational movement of the movable arm.

2. The walking device of claim 1 further comprising a motor and a microprocessor, wherein the motor is electronically coupled to the microprocessor, and wherein the microprocessor controls the motor at least partially based on the electronic signal produced by the first sensor.

3. The walking device of claim 2 further comprising a timer, wherein the microprocessor controls the motor at least partially based on an output of the timer.

4. The walking device of claim 2 further comprising a second sensor different from the first sensor, wherein the second sensor senses a rotational position of the movable arm, and wherein the microprocessor controls the motor at least partially based on an output of the second sensor.

5. The walking device of claim 2 wherein the microprocessor is capable of sensing a current draw of the motor, and changing a rotational movement of the motor if the current draw exceeds a predetermined threshold.

6. The walking device of claim 1 further comprising a locking device, wherein the electronic signal produced by the first sensor is capable of at least partially causing the locking device to move to an opened position.

7. The walking device of claim 6 further comprising a spring, wherein the spring is capable of moving the movable arm when the locking device is in the opened position.

8. The waling device of claim 6 further comprising a counter weight, wherein the counter weight is capable of moving the movable arm when the locking device is in the opened position.

9. The walking device of claim 1 wherein the first sensor is an accelerometer and wherein the movable arm is flexible so that it can bend.

10. The walking device of claim 1 wherein the first sensor is further capable of detecting on which side the walking device is resting when it is in a relatively horizontal position.

11. A module for attaching to a walking device comprising:
    a movable arm;
    a power source; and
    a first sensor;
    wherein the first sensor is capable of detecting an orientation of the walking device and producing an electronic signal based on the orientation, wherein the orientation reflects an angular position of the walking device, and wherein the electronic signal is capable of at least partially causing a rotational movement of the movable arm.

12. The module of claim 11 further comprising a motor and a microprocessor, wherein the motor is electronically coupled to the microprocessor, and wherein the microprocessor controls the motor at least partially based on the electronic signal produced by the first sensor.

13. The module of claim 12 further comprising a timer, wherein the microprocessor controls the motor at least partially based on an output of the timer.

14. The module of claim 12 further comprising a second sensor different from the first sensor, wherein the second sensor senses a rotational position of the movable arm, and wherein the microprocessor controls the motor at least partially based on an output of the second sensor.

15. The module of claim 12 wherein the microprocessor is capable of sensing a current draw of the motor, and changing a rotational movement of the motor if the current draw exceeds a predetermined threshold.

16. The module of claim 11 further comprising a locking device, wherein the electronic signal produced by the first sensor is capable of causing the locking device to move to an opened position.

17. The module of claim 16 further comprising a spring, wherein the spring is capable of moving the movable arm when the locking device is in the opened position.

18. The module of claim 16 further comprising a counter weight, wherein the counter weight is capable of moving the movable arm when the locking device is in the opened position.

19. The module of claim 11 wherein the first sensor is further capable of detecting on which side the walking device is resting when it is in a relatively horizontal position.

20. The module of claim 11 wherein the movable arm is flexible so that it can bend.

* * * * *